(12) United States Patent
Kautz et al.

(10) Patent No.: US 9,720,245 B2
(45) Date of Patent: Aug. 1, 2017

(54) CONTENT-ADAPTIVE LENTICULAR PRINTS

(71) Applicant: Disney Enterprises, Inc., Burbank, CA (US)

(72) Inventors: Jan Kautz, London (GB); James Tompkin, Saarland (DE); Wojciech Matusik, Lexington, MA (US); Simon Heinzle, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 869 days.

(21) Appl. No.: 13/685,938

(22) Filed: Nov. 27, 2012

(65) Prior Publication Data

US 2014/0146388 A1     May 29, 2014

(51) Int. Cl.
    *G02B 27/22*    (2006.01)
(52) U.S. Cl.
    CPC ................. *G02B 27/2214* (2013.01)
(58) Field of Classification Search
    CPC  G02B 27/22; G02B 27/2214; G02B 27/2228;
            G02B 27/2257; G02B 27/2235; G02B
            27/225; H04N 13/04; H04N
            13/0404–13/0406; H04N 13/0497; H04N
            13/0438; H04N 13/0003; H04N 13/0055;
    (Continued)

(56) References Cited

U.S. PATENT DOCUMENTS 6,490,092 B1 * 12/2002 Goggins ............ G02B 27/2214
                                                    348/E13.029

7,307,790 B1 * 12/2007 Raymond ............ G02B 3/0025
                                                    359/619
(Continued)

FOREIGN PATENT DOCUMENTS

IT  WO2011079856 A1 *  7/2011 ............... G02B 3/08
NL  WO 2012164425 A1 * 12/2012 ......... G02B 27/2214

OTHER PUBLICATIONS

Papas et al (The Magic Lens:Refractive Steganography, ACM Transactions on Graphics,vol. 31,6, Nov. 1, 2012, pp. 1-10).*

(Continued)

*Primary Examiner* — Stephone B Allen
*Assistant Examiner* — Jyotsna Dabbi
(74) *Attorney, Agent, or Firm* — Marsh Fischmann & Breyfogle LLP; Kent A. Lembke (57) ABSTRACT

A lenticular display device that is effective in increasing both perceived angular resolution and spatial resolution. These desirable results are achieved by modifying the lenslet array to better match the content of a given light field. An optimization algorithm or method (which may be implemented with software run on a computing device) is provided that analyzes an input light field and computes an optimal lenslet size, shape, and arrangement of sets of lenslets across the width of the array to better (or even best) match the input light field given a set of output parameters. The resulting lenticular display device (or print) shows higher detail and smoother motion parallax compared with fixed-size lens arrays. The usefulness of these content-adaptive lenticular prints has been demonstrated or proven using rendered simulations, by generating 3D-printed lens arrays according to the present description, and with user studies.

15 Claims, 5 Drawing Sheets

(58) Field of Classification Search
CPC ........... H04N 13/0422; H04N 13/0459; H04N 9/3197; H04N 9/3105; G03B 35/00
See application file for complete search history.

(56) References Cited

U.S. PATENT DOCUMENTS

| | | | |
|---|---|---|---|
| 2003/0174294 A1* | 9/2003 | Yanagisawa | H04N 5/7441 353/85 |
| 2007/0273679 A1* | 11/2007 | Barton | A63F 13/06 345/207 |
| 2008/0101724 A1* | 5/2008 | Baker | G06K 9/32 382/284 |
| 2011/0316881 A1* | 12/2011 | Yoshifuji | H04N 13/0409 345/634 |

OTHER PUBLICATIONS

Ueda et al (Adaptive Integral Photography Imaging with Variable focus Lens Array, Proc. of SPIE—IS & T Electronic Imaging, vol. 6803, pp. 68031A-1-68031A-9, Feb. 14, 2008).*

PapasProof Document (ACM Digital Library Entry, http://dl.acm.org/citation.cfm?id=2366205).*

* cited by examiner

CONTENT-ADAPTIVE LENTICULAR PRINTS

BACKGROUND

1. Field of the Description

The present invention relates, in general, to devices and methods for providing a three-dimensional (3D) display in a glasses-free manner, and, more particularly, to a 3D display device using content-adaptive lenticular prints and using a non-uniform lens pattern (e.g., non-uniform lenticule configuration) in the lenticular sheet (or lens array, lenticular print, or the like) to display the printed content (e.g., interlaced content provided in a planar sheet or in a non-planar arrangement when the lenses/lenticules are arranged in a non-planar configuration).

2. Relevant Background

Displays that provide the illusion of three dimensions have experienced a rebirth in the past few years. For example, lenticular displays (sometimes called lenticular prints) are a popular medium for producing automultiscopic, glasses-free 3D images. A typical lenticular display includes a lens array or lenticular sheet of lenticules or lenslets for viewing interlaced images in printed content under the lenslets. The images emitted from the lenticular sheet are offset in a way that is perceived by a viewer as a 3D image, and the 3D image changes with movement of the viewer to a new position or by movement of the lenticular display.

While most commercial displays rely on the use of special glasses, it is generally agreed by those in the industry that automultiscopic displays, i.e., displays able to provide 3D vision without glasses or headgear, offer significant advantages. The predominant automultiscopic technology presently in use (e.g., the technology behind lenticular displays) is based on parallax-type displays, which create the illusion of three dimensions by physically separating viewing rays coming from the displays. The ray separation is often achieved by placing tiny lens arrays in front of a display surface (e.g., interlaced printed content or images). However, these lenticular lens arrays are always arranged on a regular grid with the lenslets or lenticules being uniform in cross sectional shape and arranged in a plane to accommodate the maximum possible depth. Unfortunately, 3D scenes often do not cover all depth ranges throughout the scene, and local patches of the scene are not effectively presented by such displays.

Work and research has been performed to improve the quality of lenticular display devices. Most work has concentrated in areas such as integral imaging, parallax barrier-type displays, and multi-layer light field displays. Some improvements have been obtained such as with increased resolution and depth of field, but none of these efforts has been optimized for a given scene, which has led to suboptimal results. Therefore, there remains a need for an improved lenticular display device or apparatus that more effectively displays a wide variety of captured scenes or display content (e.g., that does not use a one-size (or one lenticular lens array) fits all content-type design).

SUMMARY

A content-adaptive lenticular display device or apparatus (also called a lenticular print herein) is provided to provide enhanced glasses-free 3D images. It was recognized that traditional lenticular displays utilized lenticular sheets with uniform lenticules or lenslets, and these traditional lenticular devices emitted a light field that had a fixed spatial and angular resolution. Hence, prior lenticular devices were designed based on a trade-off between spatial resolution and angular resolution that was defined by the width of the individual lenslets as well as the number of pixels underneath each of the lenslets (e.g., size of each interlace of the underlying printed image).

The lenticular display devices described herein are effective in increasing both perceived angular resolution and spatial resolution. These desirable results are achieved by modifying the lenslet array to better match the content of a given light field. An optimization algorithm or method (which may be implemented with software run on a computing device) is described by the inventors that analyzes an input light field and computes an optimal lenslet size, shape, and arrangement of sets of lenslets across the width of the array to better (or even best) match the input light field given a set of output parameters. The resulting lenticular display device (or print) shows higher detail and smoother motion parallax compared with fixed-size lens arrays. The usefulness of these content-adaptive lenticular prints has been demonstrated or proven using rendered simulations, by generating 3D-printed lens arrays according to the present description, and with user studies.

The content-adaptive lenticular prints or display devices introduced by the inventors may be thought of as providing a static display method that uses a modified lens array, which is optimized for a given static input light field (e.g., by use of differing lens configurations in differing portions of the lens array and by placing the lenses/lenticules in differing planes). The described approach was motivated, in part, by the observation that light fields generated from real world scenes often show locally varying angular and/or spatial frequency content. Therefore, it was recognized that a regular lenticular arrangement using a single type of lenticule or lenslet often cannot reproduce such real world light fields efficiently, and it was further understood by the inventors that parts of these light fields could be better represented by using different lens sizes and arrangements by exploiting the varying frequency content.

Content-adaptive lenticular prints are achieved by computing an optimal arrangement of different lens (or lenslet, lenticule, or the like) sizes based on an analysis of an input light field. For example, a discrete optimization algorithm may be applied to distribute a precomputed set of lenslets according to the angular frequencies and spatial frequencies of the input light field. The optimization algorithm may then generate a lenticular print supporting horizontal parallax with improved angular and spatial resolution. In addition to the distribution algorithm, an optimal set of input lenses may be determined given specific manufacturing limits. Furthermore, additive 3D multi-material printing technology may be used or employed to produce a lens array with content-adaptive lenslets for use in a lenticular display device/apparatus of the present description. Using such 3D printing, general-purpose lenticular display features may be introduced or provided in the lenticular display device such as view blockers (e.g., using baffles), a non-planar projection surface or interlaced content layer, and/or oriented lenslets for better field of view usage. Again, the improved reproduction quality achieved with these techniques has been demonstrated with simulated results as well as proof-of-concept physical prototypes that were manufactured using an additive, multi-material 3D printer.

More particularly, a content-adaptive display apparatus is provided that includes a content layer (e.g., a printed image) including a plurality of images (e.g., interlaced images when the display is a lenticular device). The apparatus also includes a lens array overlying the content layer, wherein the lens array comprises a first set of lenses each with a first width and a second set of lenses each with a second width differing from the first width. In other words, the lens array does not contain uniformly sized and arranged lenses.

In some cases, the content layer has first and second portions with first and second angular frequencies, and the second angular frequency differs from the first angular frequency and the second spatial frequency differs from the second spatial frequency. In such cases, the first set of lenses is aligned with the images in the first portion and the second set of lenses is aligned with the images of the second portion, whereby the first and second widths are matched to the content layer (e.g. to provide content-adaptive lens configurations). The first angular frequency may be greater than the second angular frequency; then, the first width would be greater than the second width. In the same or other cases, the first spatial frequency may be less than the second spatial frequency; then, the first width would also be greater than the second width to improve the display's resolution.

In some implementations, the content layer is non-planar, and each of the lenses has a back surface adjacent to the content layer, whereby a projection surface defined by the back surfaces is non-planar. Further, in such cases, each of the lenses may have a front edge (or lens surface), and the front edges may be aligned to be co-planar. Additionally, in some embodiments of the display apparatus, a plurality of field-of-view baffles may be provided and sandwiched between adjacent pairs of the lenses, whereby cross-view zone artifacts are reduced in the display apparatus.

DETAILED DESCRIPTION

Briefly, the present description is directed toward content-adaptive lenticular display devices (or prints) configured to better cover all or more depth ranges throughout a selected input scene (content or input static light field). The display devices differ from conventional lenticular devices in that the lenticules differ in size across the width of the lens array such that sets of lenticules can be provided to suit the differing content across a scene. Further, the lenticules may also be non-planar such as with the back planes or surfaces of the lenticules being in two, three, or more parallel but offset planes with the content printed or provided on or adjacent to these back planes/surfaces (e.g., the content or interlaced image layer also being non-planar).

Prior to describing the new content-adaptive lenticular prints, it may be useful to explain conventional lenticular display devices and their operation. The following provides a summary of the principles of automultiscopic displays based on lenticular lens arrays, with the assumption that each lens or lenticule is modeled using a perfect pinhole.

Figure 1:
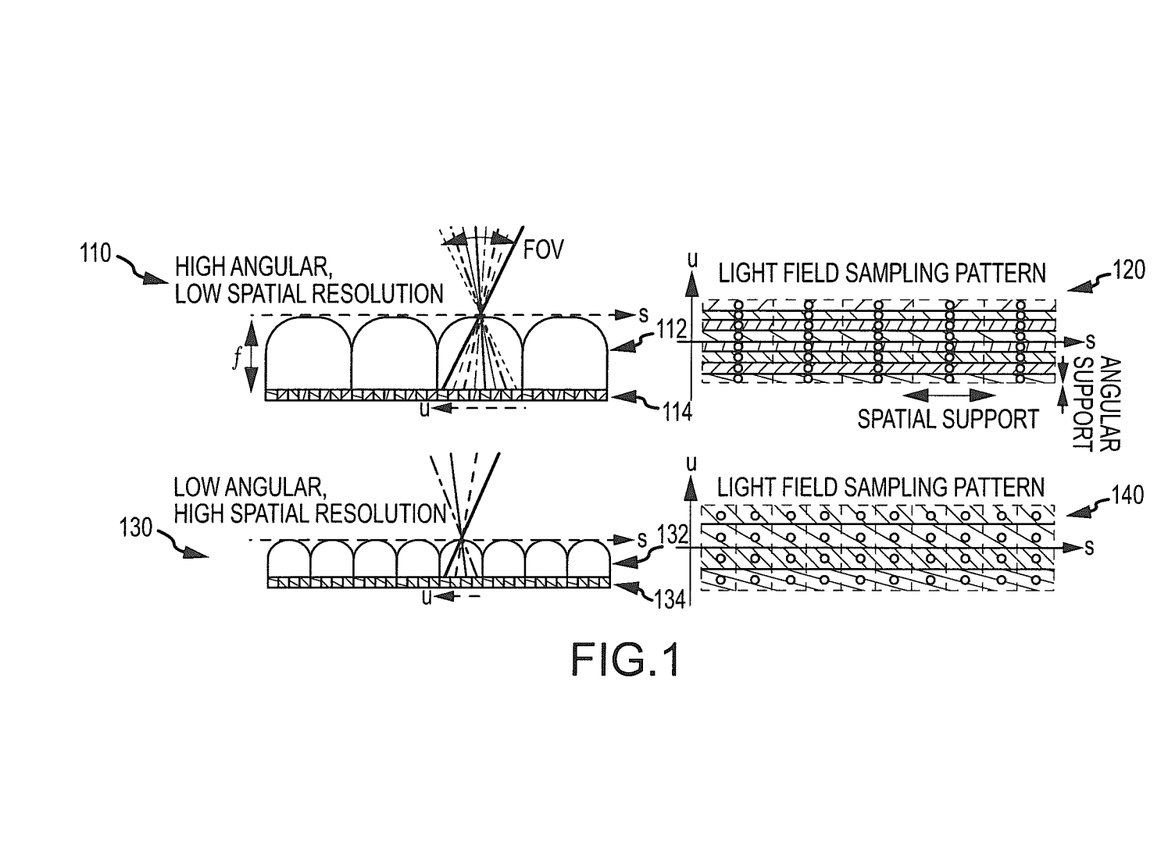
FIG. 1 illustrates schematic, partial end views of two conventional lenticular display devices with uniform and planar lenslets or lenticules for displaying a sampled light field.

FIG. 1 illustrates first and second lenticular displays 110, 130 each with a plurality of uniform lenses or lenticules (or a lens array) in arrays 112, 132 with an image pattern or layer 114, 134 located at the planar, back surface of the lenses in arrays 112, 132 so as to be located at the focal planes of these lens arrays 112, 132. Different viewing directions are multiplexed to different pixels on the image plane, giving rise to an automultiscopic display.

The (u,s) sampling patterns 120, 140 (or 2D light field) of these lenslet arrays 110, 130 are shown adjacent the arrays 110, 130. The width w of the lens defines its extent in the spatial (s) domain. The focal length f and width w define the field of view of the lens, which in turn defines the angular (u) support. Note, the sampling pattern will get increasingly dense in angular direction at the cost of trading it against spatial resolution when keeping the field of view constant.

FIG. 1 may be thought of as showing one line of lenticular displays 110, 130, with different viewing directions being angularly multiplexed through the lenses of arrays 112, 132 and being mapped to different pixels on the image planes or planar image layers 114, 134. An observer (not shown) at some distance from the lens arrays 110, 130 will, therefore, see different pixels for different positions along the horizontal axis and will perceive motion parallax as well as stereoscopic depth cues. The lens arrays 110, 130 emit output light fields that can each be characterized by a spatial and angular pattern (s,u), as shown in FIG. 1. The spatial sampling domain is denoted by s, and the angular domain is denoted by u. The angular sampling points are defined relative to their respective spatial sampling points. In other words, s denotes the origin of the ray, whereas u describes the direction of the emitted ray.

Using this definition, each lens in arrays 112, 132 defines a spatial sampling location and emits multiple angular samples from the display planes 114, 134, as shown in FIG. 1. The spatial sampling density is defined by the lens width w, whereas the angular sampling density is characterized by the focal length f and underlying pixel density $\Delta c$. Each column in the (u,s) plots 120, 140 denotes one lens in arrays 112, 132, and each row denotes a set of parallel rays. The exact sampling densities can be arbitrary but are often bound by the possible resolution of the display surface as well as the optical qualities of the employed lenses.

FIG. 1 shows two different configurations with display devices 110, 130, assuming a constant density on the display surfaces 114, 134 as well as a constant field of view. As can be seen in FIG. 1, increasing the width of the individual lenses in arrays (from array 132 to array 112) increases the number of angular samples and subsequently allows the support of more angular variation. However, the increased angular resolution comes at the cost of a reduced spatial resolution in display device 110 compared to device 130. Unfortunately, this is a fundamental trade off for conventional lenticular and parallax barrier-based displays, such as those shown in FIG. 1.

As can be seen from the above discussion, prior or conventional lenticular displays were based on regular (u,v) sampling patterns. However, the local angular and spatial frequencies of natural light fields often differ considerably, and, as a result, many of the (u,v) samples are often either wasted or not optimally placed for a given light field content with a uniform lens configuration-type lens array.

Figure 2:
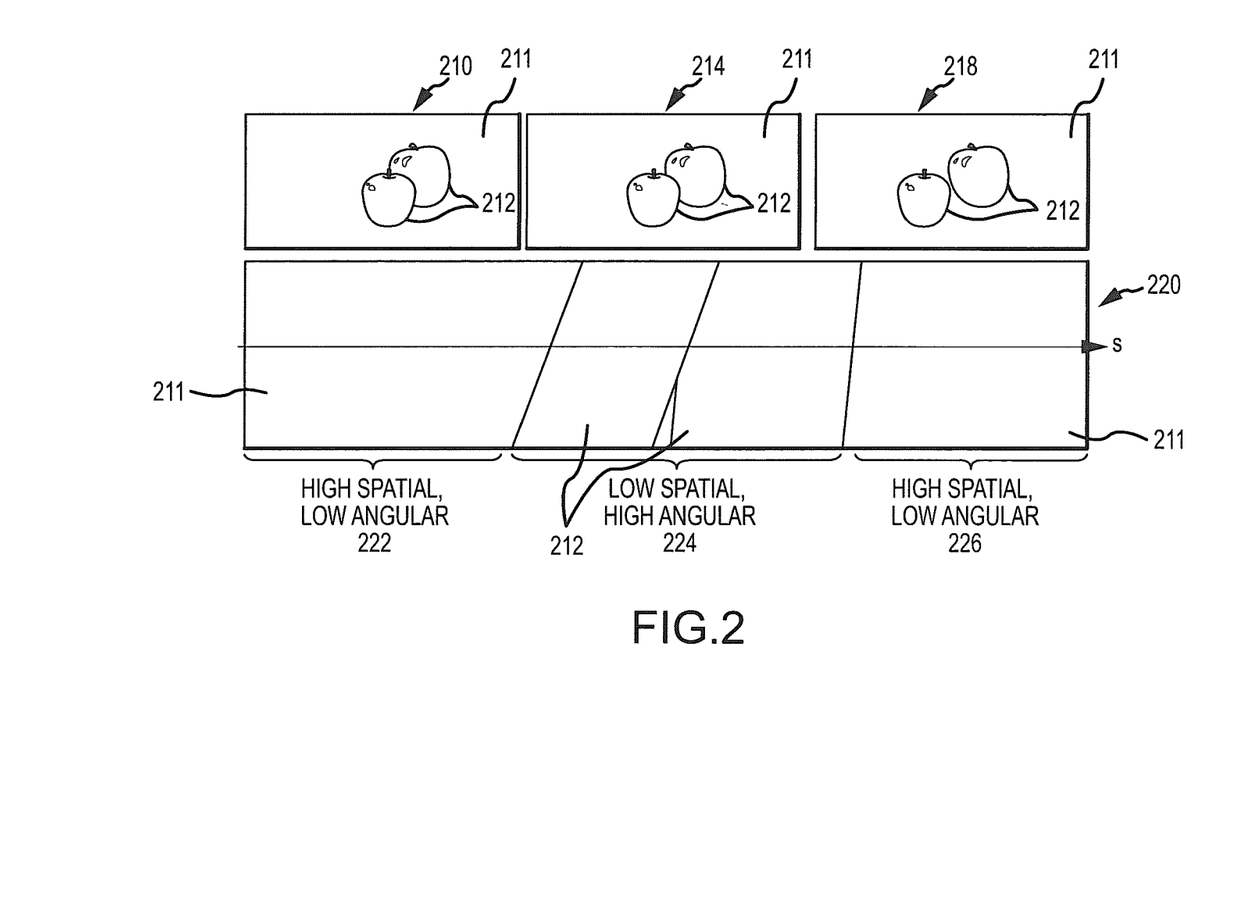
FIG. 2 illustrates frames of an input scene along with a corresponding image of one line of this input showing differing angular and spatial frequencies in this input content that may be used with a lens array of a lenticular display device.

For example, FIG. 2 illustrates three frames or images 210, 214, 218 of an input scene. The local angular and spatial frequency content of the light fields differs considerably in these frames 210, 214, 218. This can be seen with the frequencies for one line of the input light field as shown with epipolar plane image (EPI) representation 220. In the frames 210, 214, 218, the background wall 211 is positioned approximately at the focal plane of the display, and the two images/objects (foreground objects) 212 float at different distances in front of the focal plane or wall 211. As can be seen in EPI representation 220, the angular frequencies of the wall 211 are very low while its spatial frequencies are very high, as shown with high spatial, low angular regions/portions 222, 226 of EPI representation 220. In contrast, the foreground objects (apples, in this example) 212 features or provides high angular frequencies at low or moderate spatial frequencies, as shown with low spatial, high angular region/portion 224 of EPI representation 220.

In the example of FIG. 2, the wall 211 is located right at the focal point such that the angular frequency content at each point on the wall is low. In other words, all viewing directions see the same color. However, the spatial frequency content is high (i.e., the wall 211 is textured). The objects in front of the focal plane (and the wall 211) require much less spatial frequency and much more angular frequency due to their distance from the display.

The following insight, hence, motivated the inventors: while objects close to the display would ideally have lenses with low angular variation (e.g., lens width of one pixel or the like), objects further away from the display plane would benefit from larger lenses. Therefore, the inventors determined that is would be useful to have lenticular display devices with lens arrays in which the lenses are adjusted "locally" in the array in order to better replicate the input light field. This can be achieved, in some embodiments, by distributing lenses (or sets of lenslets/lenticules) of varying size in conjunction with optimizing the image pattern, such that the light field emitted from the display device generates the least error compared to the input light field. With this in mind, the following paragraphs describe a discrete optimization method or process for generating an adaptive lens distribution. Then, the description turns to a discussion of a strategy/process for finding optimal shapes for the individual lens elements/lenticules in a lens array.

With regard to discrete light field optimization, one goal of the discrete optimization is to find a lens distribution for a lens array that generates an output light field $l_{out}$ that matches an input light field $l_{in}$ as closely as possible. More formally, the discrete light field optimization algorithm or method finds the optimal lens distribution such that:

$$L_O = \min_L(\text{norm}(l_{in}, l_{out}(L))) \quad \text{(Eq. 1)}$$

where $L_O = \{l_i | i=1 \ldots n\}$ denotes the optimal lens distribution, and norm( ) can be any appropriate norm, e.g., L2 or gradient based. Each lens $l_i = \{w_i, c_i, f_i\}$ may be characterized by its width $w_i$, the color content of the back surface $c_i$, and the focal length $f_i$.

The optimization may be restricted to a pre-defined discrete set of widths that are possible (or practical) for a given manufacturing process. The field of view of all lenses and the resolution of the color content are kept constant across the whole display. As a result, the angular resolution of a lens increases with its width $w_i$.

Solving for the optimal distribution given a discrete set of lenses is a packing problem, similar to the knapsack problem. In the discrete optimization cases, however, the weights are not known a priori, as each lens will result in different error terms for a given light field. Therefore, one technique is to use a bottom-up dynamic programming approach to find an optimal distribution $L_O$ for an input light field $l_{in}$. Briefly, an algorithm/method may place a candidate lens/lenticule and then recursively determine the best solution for the remainder of the light field. In some embodiments, the optimization involves only solving for horizontal parallax, and, therefore, the algorithm/calculation method can be evaluated independently on single scanlines.

In each recursion step, all possible lenses from a discrete set of candidates are placed on one side of the input light field. Then, the same procedure is evaluated recursively on the remaining subset of the light field not covered by the lens. The recursion stops as soon as the width of the remaining subset is equal to or smaller than the smallest candidate lens. Then, the error induced by the current lens placement is propagated up and in each stage of recursion the lens arrangement with the lowest error is selected. The following pseudo-code summarizes the optimization algorithm (Algorithm 1: e=computeLensDistribution($l_{in}$)):

for all possible candidate lenses $l_i$
    $e_i$ = error($l_i \cap l_{in}$) + computeLensDistribution($l_{in} \setminus l_i$)
return lens $l_i$ with lowest error $e_i$ The error that a lens incurs follows the same metric as defined in Eq. 1, but it is computed only over the subset of the light field covered by the lens. Therefore, Algorithm 1 provides an optimal solution for Eq. 1.

As shown in FIG. 1, each lens covers a number of spatial and angular samples from the input light field, and the input samples should be resampled at the spatial-angular samples of the lens. A box filter may be employed according to the output sampling width, and, as a result, each pixel u on the display surface is computed from the mean color of the input rays covered by each output sample. When employing an L2 norm, the squared difference between the color of the input rays and output rays defines the error between input and output light fields, for a given lens placed at one position.

With regard to spatial weighting versus angular weighting, the L2 error described in the previous paragraph can directly be computed in the light field domain. However, the angular and spatial dimensions can be reweighted in some embodiments if desired. Instead of computing a 2D box filter along both dimensions, the angular and spatial errors can be computed individually and then combined using a spatial-angular weighting factor. This way, the surface generation can be steered to either focus on reproducing the angular variation or on reproducing spatial variation. In some embodiments or implementations produced by the invention, both dimensions were weighted equally (but this is not required to practice the invention).

Regarding multi-scanline solves, the discrete light field optimization algorithm described above computes the optimal lens distribution for each scanline individually, which can lead to spatial noise along otherwise crisp edges. This can be mitigated by choosing similar lenses in neighboring scanlines. To this end, this algorithm can be extended such that a sliding window of multiple scanlines is used to compute the lens arrangement for each particular scanline. This allows an increase in smoothness at a small overhead in computational cost.

Turning now to lens optimization, an appropriate set of candidate lenses (or lenticules or lenslets) is determined before the full surface is generated in order to generate the desired lens arrangement computed using the discrete light field optimization algorithm. Given a minimum lens size for a lens array of a lenticular display device and a target display resolution, a first step may be to optimize for lenses of the desired widths. In general, lenticular lenses or lenticules are formed by combining 1D cylindrical lenses with a planar back surface. While multi-lens systems are possible, the resulting manufacturing complexity is inhibitive for practical systems, as well as for automatic printing. Therefore, the inventor determined it may be useful to employ plano-convex lenses, and search for lenses that result in the best focusing quality across all views for a given overall field of view. While analytical solutions for minimizing spherical aberration for the center views exist, yielding similar solutions for multiple off-center views is tedious to achieve, especially if one wishes to minimize coma aberrations.

Hence, it was decided by the inventors that it may be useful to employ numerical optimization to generate the optimal lens shape, given a specific lens model. The numerical optimization not only minimizes (or reduces) aberrations but also optimizes (or at least enhances) the display surface to arbitrary shapes for better focusing properties. Spherical lenses and aspherical lenses were investigated for use in the lens arrays. In general, aspherical lenses tend to be superior compared to spherical lenses, especially for the center views. The result of a numerical optimization for a 5 mm lens with a 30° field of view were obtained with ray tracing supporting the above generalized results (average focus errors being less for aspherical lenses).

A variety of manufacturing or fabrication processes may be used to produce the lenticular display devices of the present invention, and these processes may be relatively flexible such that a number of optimization processes can be used to provide more optimal lenses/lenticules for the array. First, for example, the shape of the display surface may be adapted, and second, for example, the lenses may be rotated towards the primary viewing location.

One way to provide an improved lens array that may be content-adaptive is to provide or use a non-planar display surface (e.g., the planar back surface of a conventional lens array is replaced with a non-planar back surface or display surface on which the display content or interlaced images are printed or otherwise provided underneath corresponding lenticules/lenslets). Interestingly, the optimal focusing distance for different views does not lie on a plane, and, ideally, the back plane should be at a different depth for different views (content layer should be non-planar to coincide with these differing focusing distances).

With this in mind, alternative back plane shapes were incorporated into the lens optimization: axis-aligned planar patches, non-axis aligned facets, and parametric curves. In general, the views close to the optical axis of the lenses can be improved greatly by this optimization, whereas the off-axis views tend to perform similar to the initial optimization result. One set of optimization results indicated that the resulting focus error can be reduced by 17.5 percent and 20.8 percent, respectively, for axis-aligned and non-axis aligned facets for a material with index of refraction of 1.47.

Another lens optimization technique involves lens rotation. Using regular lenses with their optical axis aligned to one direction may waste many rays on the borders of the lenslet array, as these rays fall outside the combined field of view of all lenses. Due to the lens characteristic for off-axis views, lenses on the borders of the lens array may show increased crosstalk. In order to reduce or even minimize these effects, the optical axis may be aligned to the expected center position of the viewer. More specifically, the amount of rotation for each lens is chosen such that all optical axes intersect at the center position for an assumed viewer distance.

Figure 3:
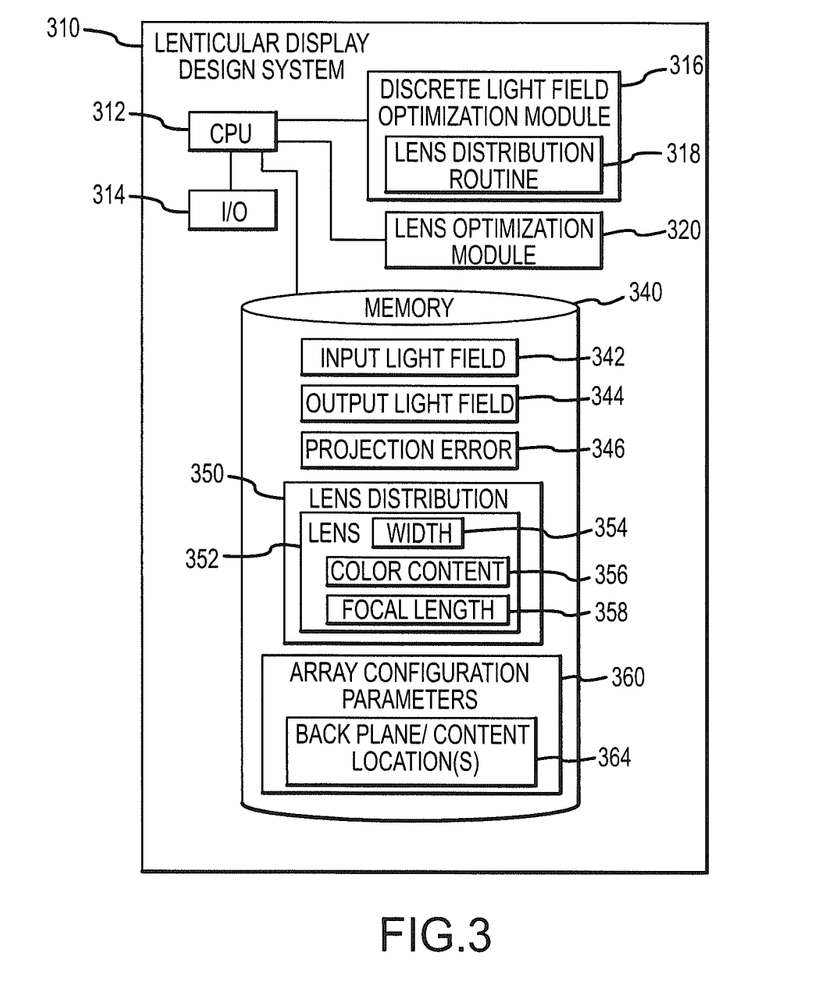
FIG. 3 is a functional block diagram of a system for use in designing a lenticular display that is content-adaptive.

FIG. 3 illustrates a functional block diagram of a lenticular display design system 310 that may be used by an operator to design a lenticular display device that is content-adaptive as discussed herein. The system 310 may be provided on one or more computer devices running software or computer code to perform the functions described, and, to this end, the system 310 includes a processor 312 managing input/output (I/O) devices 314 such as a monitor, touchscreen, touchpad, keyboard, mouse, and the like as well as memory or memory devices 340 (e.g., computer readable medium on the system 310 or accessible by the system 310 and/or CPU 312). The CPU 312 runs software or computer programs including a discrete light field optimization module 316, which may use a lens distribution routine 318 (e.g., to implement Algorithm 1 defined above), and a lens optimization module 320. The module 316 may be used to perform the discrete light field optimization steps or functions described above while the module 320 may be used by the system 310 to perform the lens optimization steps or functions described above.

During operation of the system 310, the memory 340 is used to store an input light field 342 corresponding to a scene that is to be displayed by a lenticular display device. The discrete light field optimization module 316 uses the distribution routine 318 to generate a lens distribution 350, in a recursive manner as described above, to produce a number of lenses 352 across the width of a lens array such that the output light field 344 provided by these lenses matches or most closely matches the input light field 342 (e.g., based on reducing mean squared projection errors 346 for the lenses 352 or the like).

Each lens 352 in the array is defined or characterized by its width 354, the color content at its back surface 356, and a focal length 358. In the lens array defined by these lenses, each lens 352 across the width of the lens array may differ in these three parameters 354, 356, 358, but, in a typical array, the lenses may be arranged in sets in which the lenses are uniform within the set but differ from other sets. For example, wider lenses with a greater focal length may be placed at the two ends of the array, intermediate width lenses may then be provided adjacent to these two sets of wider lenses, and then one or more narrower and narrower lens sets may be placed in the center for the array. However, wider lenses with larger focal lengths may also be provided in the center of the array if that suits or adapts to the particular input light 342. The number of differing lens sets is not limiting to the invention, but it may often include at least two differing widths with 3 to 10 or more being useful, in some cases, across a particular array so as to suit the differing angular and spatial frequencies of the content.

Figure 5:
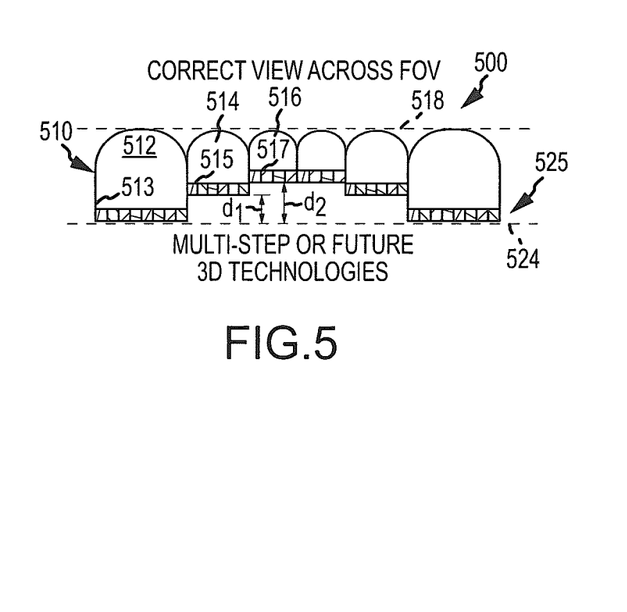
FIG. 5 is an end view of a lenticular print with a non-planar or irregular content layer or projection surface and with a lens arrays with front edge/lens surfaces aligned or coplanar.
Figure 6:
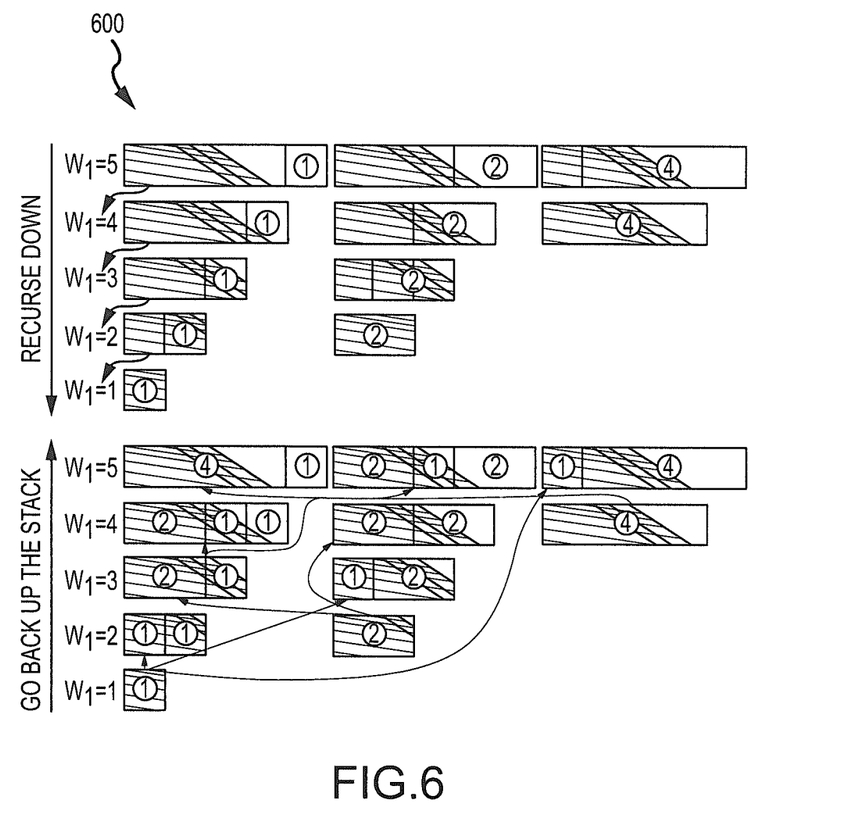
FIG. 6 illustrates graphically a discrete light field optimization method of one embodiment.

The lens optimization module 320 is used to define a set of array configuration or fabrication parameters such as whether the back plane is planar or non-planar. The module 320 may be used to implement a lens optimization process such as to define a non-planar display surface with content locations 364 stored in memory 340. This may involve setting the front edges or surfaces of each of the lenses in a plane (i.e., a front plane or light receiving surface) but placing the content layer or display images at or near the focusing distances of each lens 352 (which may differ across the width of the array such that the back plane or content layer is non-planar or stepped). In other words, the content locations 364 relative to a rear plane such as a backing surface or backlight will vary for the lens array defined by the lens distribution 350 and array configuration parameters 360 (as shown in FIGS. 5 and 6).

Figure 4:
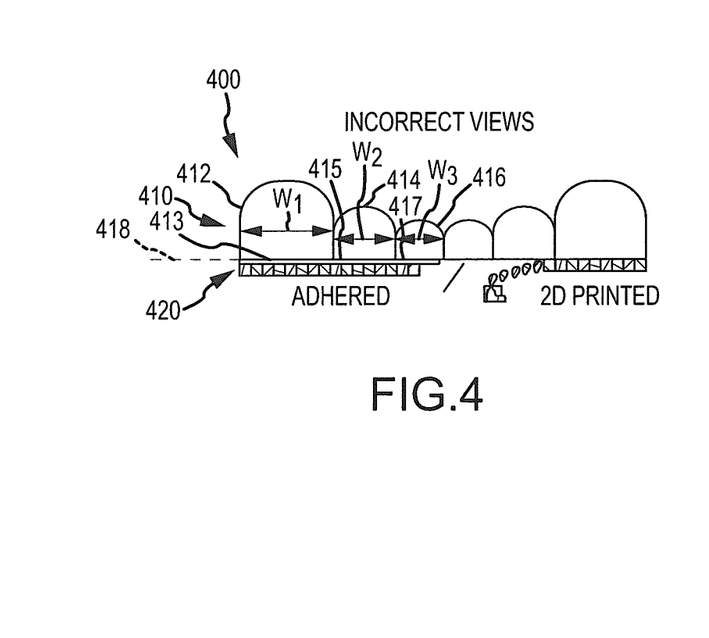
FIG. 4 is an end view of a lenticular display device (lenticular print) with a planar content layer (or back plane)

Lenticular display devices (or lenticular prints) often are fabricated with a lens sheet or array with a printed image sheet or layer that is glued underneath on the planar back surface (e.g., the content is arranged in a single plane or to be planar). FIG. 4 illustrates a lenticular display device 400 according to the present invention with such a planar content configuration. As shown, the device 400 includes a lens array or sheet 410 with lenses/lenticules 412, 414, 416 with differing configurations as shown by the three differing widths ($w_1 > w_2 > w_3$). The lenses 412, 414, 416 were distributed to suit an input light field, and content or images associated with such a light field are provided in content/ink layer 420 that may be glued/adhered or directly printed with 2D printing onto the array 410. Particularly, the back surfaces of each lens 413, 415, 417 are in a planar backplane 418, and these surface 413, 415, 417 may receive the content layer/ink layer 420 in the lenticular print 400. By varying the configuration of the lenses 412, 414, 416, the array 410 can be thought of as being content-adaptive to suit the underlying spatial and angular frequencies of the content layer 420.

The lenticular sheet 410 may be composed of optical quality plastic resin and may be created by extruding plastic underneath a drum shaped with the inverse of the required lens profile. Affixing the image 420 to the lens array 410 may require pixel-accurate registration in order for the light field to appear correctly. As the lens array 410 changes shape and position of the lenses 412, 414, 416 over the image layer 420, existing lenticular fabrication processes may be less practical. For example, a drum or mold may be manufactured to create the correct lens array shape, but, the present invention teaches the usefulness of changing the lens array shape (use differing lenses 412, 414, 416) for each input light field or content layer 420. Therefore, it may only be economical to use conventional fabrication processes for large print runs to display a particular scene/input light field.

With the advent of high-accuracy 3D printing technology, the content-adaptive lenticular display devices become much more applicable and accessible. For example, the lens array 410 may instead be fabricated using 3D printing devices. The inventors, in one case, employed an additive multi-material printer that fabricates 16 μm-accurate object layers using UV-curable resin (e.g., an Objet Connex 3D polymer printer or the like may be used). This printer was able to print two different material simultaneously so that the prototype lenticular print was fabricated by fabricating the lens array concurrently with the content layer (or display surface) rather than using separately printed cards.

FIG. 5 illustrates a more preferred embodiment of a lenticular print 500. The print 500 includes a lens array or lenticular sheet 510 made up of a number of lenses/lenticules 512, 514, 516 that, like print 400, have differing widths, color content on their back surfaces, and focal lengths that are selected to suit the content or input light field corresponding with content or image layer 520. The print 500 differs from print 400, though, because the front edges or receiving surfaces of the lenses 512, 514, 516 are arranged in plane (or frontplane) 518 so that the array 510 has a correct view across the field of view.

Further, this results in the back surfaces 513, 515, 517 of the lenses 512, 514, 516 being non-planar as shown by the differing distances, $d_1 < d_2$, from a backplane or rear reference plane 524, with the largest width lenses 512 having their back surfaces 513 co-planar with this plane 524 and the offsets increasing as the width of the lens decreases (or its focal length decreases). Since the back surfaces 513, 515, 517 are non-planar in array 510, the content layer is also nonplanar or arranged with a multi-step alignment so that the content/interlaced images are placed at or near the focal distance of each overlying lens 512, 514, 516. Although not shown, a diffuse backing and/or backlight may be provided in the display device 500 such as to be coplanar with the reference plane 524 or to sandwich the content layer 520 between the back surfaces 513 of larger lenses 512.

Hence, instead of using one display or projection surface for all lenses (e.g., content layer 420 in display device 400 of FIG. 4), the lens surfaces may be aligned with plane 518 in device 500 rather than their focal planes. This reduces crosstalk through adjacent, higher lenses. One benefit of 3D printing the lenses 512, 514, 516 of array 510 concurrently with content 520 is that the display surface or content layer 520 is aligned with the lens surface. Furthermore, 3D printing of device 500 allows for printing lenses with non-planar projection or back surfaces 513, 515, 517.

In one implementation, the 3D printer is only able to print two materials at the same time. In this limited embodiment, the first material may be a transparent resin to realize the lens shape and the second material may be used to display content, e.g., a black material to display content. While this printer was limited to providing gray scale values for content 520, it is expected that future 3D printers will support multiple colors, thus more effectively providing colored content-adaptive lenticular prints (such as print 500). Another technique may involve a multi-step printing process. A first step may involve manufacturing the lenses with non-planar/regular focal planes or projection surfaces. Then, second, third, and more steps may be performed to fabricate or provide pixels of different colors for content/display layer 520, and the colored pixel surfaces could then be combined onto the lens shape as shown in FIG. 5.

In one embodiment, field-of-view (FOV) baffles are provided in lenticular print. Particular, the use of a multi-material or 3D printer allows one to print black (or other colored) strips between consecutive lenses/lenticules so as to reduce cross-view zone artifacts. Such effects can occur when an observer is in a viewing position outside the combined field of view of the display and are most noticeable as inconsistent view transitions across the display. Due to the material transparency, the baffle preferably is of sufficient thickness to block all or a significant amount of light striking the baffle. In some embodiments, a printer supporting multiple colors may be used such that the baffle can be printed with actual content, but the lens would have to focus on the backplane as well as the baffle in such embodiments.

FIG. 6 illustrates a graph 600 showing an example of one use of the discrete light field optimization method to distribute a set of lenses/lenticules for a lens array based on a local analysis of the 2D light field (input light field). At the top of the FIG. 600, it can be seen that an input light field is provided with a width $w_L=5$, and a set of candidate lenslets with differing widths W={1, 2, and 4}. As mentioned above, each lenslet covers a sub-area (e.g., a rectangle) of the input light field.

The optimization algorithms starts with the full light field width of $w_L=5$. It places candidate lenslets starting with w=1 on the right side of the light field and recurses to find the optimal lens distribution for the remaining left subset. This recursion continues until the base case of $w_L=1$ and w=1. The incurred error for placing this single lens is then used (shown with black arrow) to find the optimal lenslet distribution for $w_L=2$, as it now allows one to compute the error for each of the two possible lens distributions [11] (left side used optimal distribution from recursion at $w_L=1$) and [2]. [2] has the lower error and is recorded/stored in memory as the optimal lens distribution for $w_L=2$. This continues back up to $w_L=5$, where [212] has the lowest error and is the final optimal distribution in this example.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be appreciated, the above description teaches content-adaptive lenticular displays that are or can be optimized for static light field content. The concepts described above, though, are applicable to electronically changeable lenses and, therefore, to dynamic content. The description also explains a light field analysis and optimization strategy to yield an ideal lenslet layout for a lens array of a lenticular display device to provide an automultiscopic representation of a given scene. The lens array and its lenslets/lenticules can be, according to the teaching provided herein, optimized to have a design facilitating 3D printing.

We claim:

1. A display apparatus, comprising:
a static content layer comprising a plurality of images; and
a lens array overlying the content layer, wherein the lens array comprises a first set of lenses each with a first width and a second set of lenses each with a second width differing from the first width,
wherein the lenses are elongated, cylindrical lenticules and the images are elongated, interlaced images,
wherein the cylindrical lenticules of the first set of lenses each have a first radius defining the first width and the cylindrical lenticules of the second set of lenses each have a second radius, the first radius differing from the second radius to define the first and second widths of the first and second sets of lenses,
wherein the content layer comprises a first portion with a first spatial frequency and a second portion with a second spatial frequency differing from the first spatial frequency,
wherein the first spatial frequency is less than the second spatial frequency, and
wherein the first set of lenses are aligned with the images in the first portion and the second set of lenses are aligned with the images of the second portion, whereby the first and second widths are defined based on spatial frequencies of the content layer.

2. The display apparatus of claim 1, wherein the first width is greater than the second width.

3. The display apparatus of claim 1, wherein the content layer is non-planar.

4. The display apparatus of claim 3, wherein each of the lenses has a back surface adjacent to the content layer, whereby a projection surface defined by the back surfaces is non-planar.

5. The display apparatus of claim 4, wherein each of the lenses has a front edge and wherein the front edges are co-planar.

6. The display apparatus of claim 1, further comprising a plurality of field-of-view baffles sandwiched between adjacent pairs of the lenses, whereby cross-view zone artifacts are reduced in the display apparatus.

7. A display apparatus, comprising:
a content layer comprising a plurality of elongated and interlaced images; and
a lens array overlying the content layer, wherein the lens array comprises a first set of lenses each with a first width and a second set of lenses each with a second width differing from the first width,
wherein the lenses are electronically changeable lenses operable to concurrently provide the first and second widths,
wherein the content layer comprises a first portion with a first spatial frequency and a second portion with a second spatial frequency differing from the first spatial frequency,
wherein the first spatial frequency is less than the second spatial frequency, and
wherein the first set of lenses are aligned with the images in the first portion and the second set of lenses are aligned with the images of the second portion, whereby the first and second widths are defined based on spatial frequencies of the content layer.

8. The display apparatus of claim 7, wherein the content layer is operable to provide the plurality of images as dynamic content.

9. A lenticular display, comprising:
an image layer corresponding to an input light field with first, second, and third regions having differing optical qualities; and
a lenticular sheet comprising lenticules with a first width, lenticules with a second width greater than the first width, and with lenticules with a third width greater than the second width,
wherein the lenticules with the first width are aligned with the first region of the image layer, the lenticules with the second width are aligned with the second region of the image layer, and the lenticules with the third width are aligned with the third region of the image layer,
wherein the image layer is positioned adjacent back surfaces of the lenticules in the lenticular sheet and wherein the image layer and the back surfaces are non-planar with the back surfaces of the lenticules with the first width being in a first plane, the back surfaces of the lenticules with the second width being in a second plane offset from the first plane, and the back surfaces of the lenticules with the third width being in a third plane offset from the first and second planes,
wherein the first region has a lower spatial frequency than the second region and the second region has a lower spatial frequency than the third region, and
wherein the first, second, and third widths are defined based on spatial frequencies of the image layer.

10. The display of claim 9, wherein the optical qualities include spatial frequencies.

11. A display apparatus, comprising:
a content layer comprising a plurality of images; and
a lens array overlying the content layer,
wherein the lens array comprises a first set of elongated, cylindrical lenses each defined by a first radius and a second set of elongated, cylindrical lenses each defined by a second radius differing from the first radius,
wherein the content layer comprises a first portion with a first spatial frequency and a second portion with a second spatial frequency differing from the first spatial frequency, and wherein the first set of lenses are aligned with the images in the first portion and the second set of lenses are aligned with the images of the second portion, whereby the first and second radii are defined based on spatial frequencies of the content layer.

12. The display apparatus of claim 11, further comprising a plurality of field-of-view baffles sandwiched between adjacent pairs of the lenses, whereby cross-view zone artifacts are reduced in the display apparatus.

13. The display apparatus of claim 11, wherein the first spatial frequency is less than the second spatial frequency and wherein the first width is greater than the second width.

14. The display apparatus of claim 11, wherein the content layer is non-planar and wherein each of the lenses has a back surface adjacent to the content layer, whereby a projection surface defined by the back surfaces is non-planar.

15. The display apparatus of claim 14, wherein each of the lenses has a front edge and wherein the front edges are co-planar.

\* \* \* \* \*